(12) United States Patent
Yamashita

(10) Patent No.: US 11,734,256 B2
(45) Date of Patent: Aug. 22, 2023

(54) ANOMALY DETECTION METHOD AND NON-TRANSITORY COMPUTER-READABLE RECORDING MEDIUM

(71) Applicant: FUJITSU LIMITED, Kawasaki (JP)

(72) Inventor: Shinji Yamashita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 222 days.

(21) Appl. No.: 17/216,287

(22) Filed: Mar. 29, 2021

(65) Prior Publication Data
US 2022/0004535 A1    Jan. 6, 2022

(30) Foreign Application Priority Data

Jul. 1, 2020   (JP) ................................ 2020-114164

(51) Int. Cl.
| | |
|---|---|
| H04L 9/40 | (2022.01) |
| G06F 16/22 | (2019.01) |
| G06F 16/23 | (2019.01) |
| H04L 41/142 | (2022.01) |
| G06N 20/00 | (2019.01) |

(52) U.S. Cl.
CPC .......... *G06F 16/2365* (2019.01); *G06F 16/22* (2019.01); *H04L 63/1425* (2013.01); *G06N 20/00* (2019.01); *H04L 41/142* (2013.01)

(58) Field of Classification Search
CPC . G06F 16/2365; G06F 16/22; H04L 63/1425; H04L 41/142; G06N 20/00
See application file for complete search history.

(56) References Cited

U.S. PATENT DOCUMENTS

| | | | | |
|---|---|---|---|---|
| 2012/0106379 | A1* | 5/2012 | Hamaguchi | H04L 43/16 370/252 |
| 2012/0303413 | A1* | 11/2012 | Wang | G06Q 30/0202 705/7.31 |
| 2014/0179270 | A1* | 6/2014 | Anand | H04L 63/1425 455/410 |
| 2014/0298098 | A1* | 10/2014 | Poghosyan | G06F 11/3452 714/37 |
| 2018/0337832 | A1* | 11/2018 | Yamashita | H04L 41/147 |
| 2021/0117384 | A1* | 4/2021 | Leite Pinheiro de Paiva et al. .... G06F 16/9574 |

FOREIGN PATENT DOCUMENTS

| | | |
|---|---|---|
| JP | 2018-093432 A | 6/2018 |
| JP | 2018-195929 A | 12/2018 |

OTHER PUBLICATIONS

Extended European Search Report dated Jun. 30, 2021 for corresponding European Patent Application No. 21162269.1, 9 pages.
*Please note US-2018/0337832-A1 cited herewith, was previously cited in an IDS filed on Mar. 29, 2021.*.

* cited by examiner

*Primary Examiner* — Chris Parry
*Assistant Examiner* — Hassan A Khan
(74) *Attorney, Agent, or Firm* — Fujitsu Patent Center

(57) ABSTRACT

Provided is an anomaly detection method implemented by a computer, the anomaly detection method including identifying a time period during which time-series data of a parameter relating to a network have a periodicity, when a first time is within the time period, determining whether the network has an anomaly using a first method based on the time-series data, and when the first time is not within the time period, determining whether the network has an anomaly using a second method different from the first method.

8 Claims, 15 Drawing Sheets

ANOMALY DETECTION METHOD AND NON-TRANSITORY COMPUTER-READABLE RECORDING MEDIUM

CROSS-REFERENCE TO RELATED APPLICATION

This application is based upon and claims the benefit of priority of the prior Japanese Patent Application No. 2020-114164, filed on Jul. 1, 2020, the entire contents of which are incorporated herein by reference.

FIELD

A certain aspect of embodiments described herein relates to an anomaly detection method and a non-transitory computer-readable recording medium.

BACKGROUND

With the expansion of cloud services and Internet of Things (IoT), network traffic flow rates have continued to increase. Network administrators preferably determine anomalies such as rapid increase and rapid decrease in the traffic flow rate with high accuracy by monitoring the network they are managing at periodic intervals. Note that the technique related to the present disclosure is also disclosed in Japanese Laid-Open Patent Publication No. 2018-195929.

SUMMARY

According to an aspect of the embodiments, there is provided an anomaly detection method implemented by a computer, the anomaly detection method including: identifying a time period during which time-series data of a parameter relating to a network have a periodicity; when a first time is within the time period, determining whether the network has an anomaly using a first method based on the time-series data; and when the first time is not within the time period, determining whether the network has an anomaly using a second method different from the first method.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Prior to the description of an embodiment, the facts examined by the inventor will be described. Autoregressive Integrated Moving Average (ARIMA) has been one of models for forecasting the present traffic flow rate from the past traffic flow rate of the network. The following will describe ARIMA.

Figure 1:
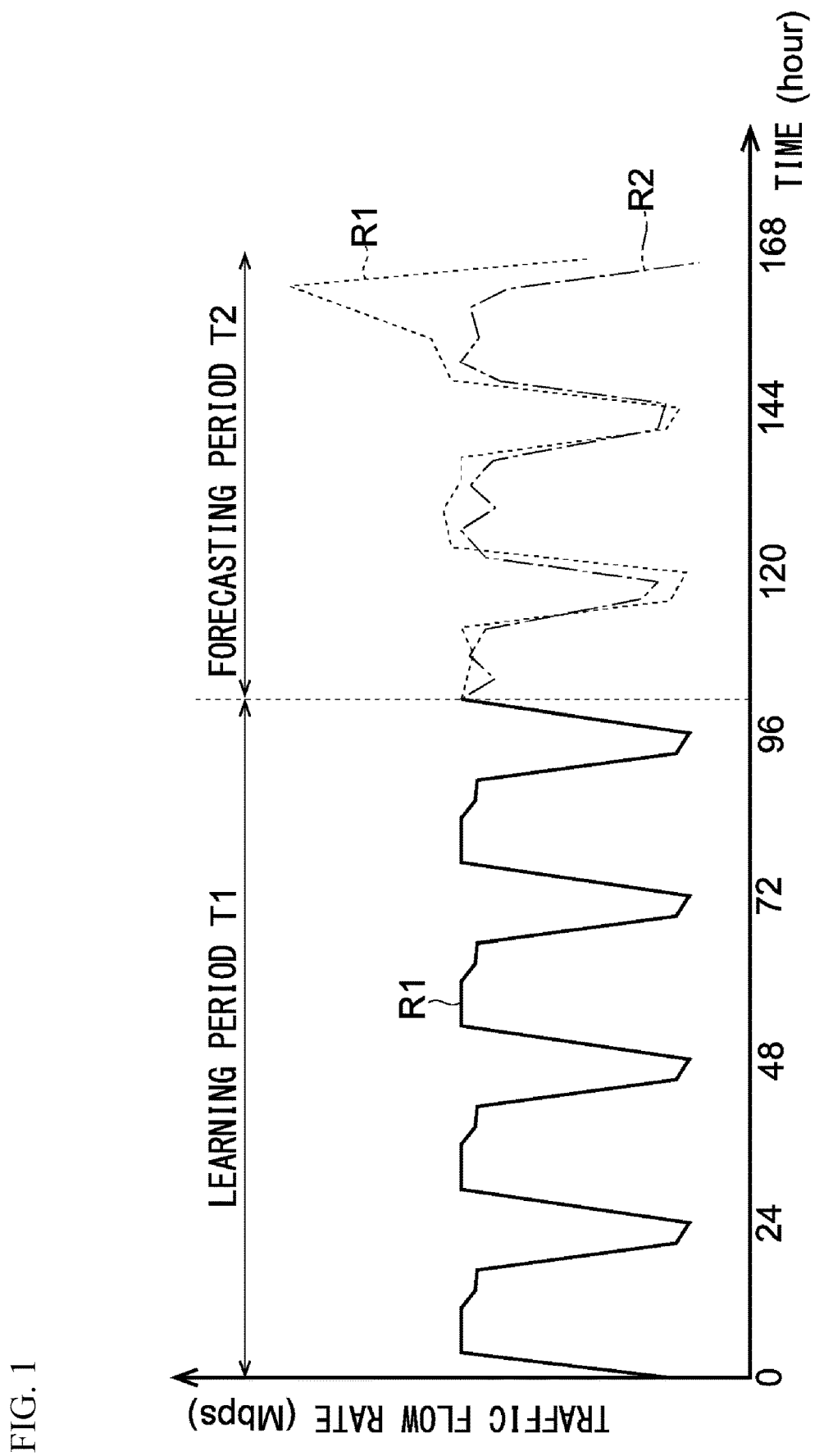
FIG. 1 illustrates temporal variations in a traffic flow rate of a network.

FIG. 1 illustrates temporal variations in the traffic flow rate of a network. Here, the traffic flow rate of the network connected to a certain customer system will be described as an example.

In ARIMA, a computing machine such as a personal computer (PC) learns the actual measurement value R1 of the past traffic flow rate in a learning period T1. The learning period T1 is, for example, approximately one week to four weeks. When the network is connected to the customer system as in this example, the traffic flow rate increases with the start of the business hour when the customer starts business operations, and the traffic flow rate decreases with the end of the business hour. Therefore, the traffic flow rate in the learning period T1 varies periodically every 24 hours.

Then, the computing machine forecasts the forecast value R2 of the traffic flow rate expected in a forecasting period T2 using the actual measurement values R1 in the learning period T1. Then, when the actual measurement value R1 in the forecasting period T2 deviates from the forecast value R2 significantly, the computing machine determines that the network has an anomaly.

Figure 2:
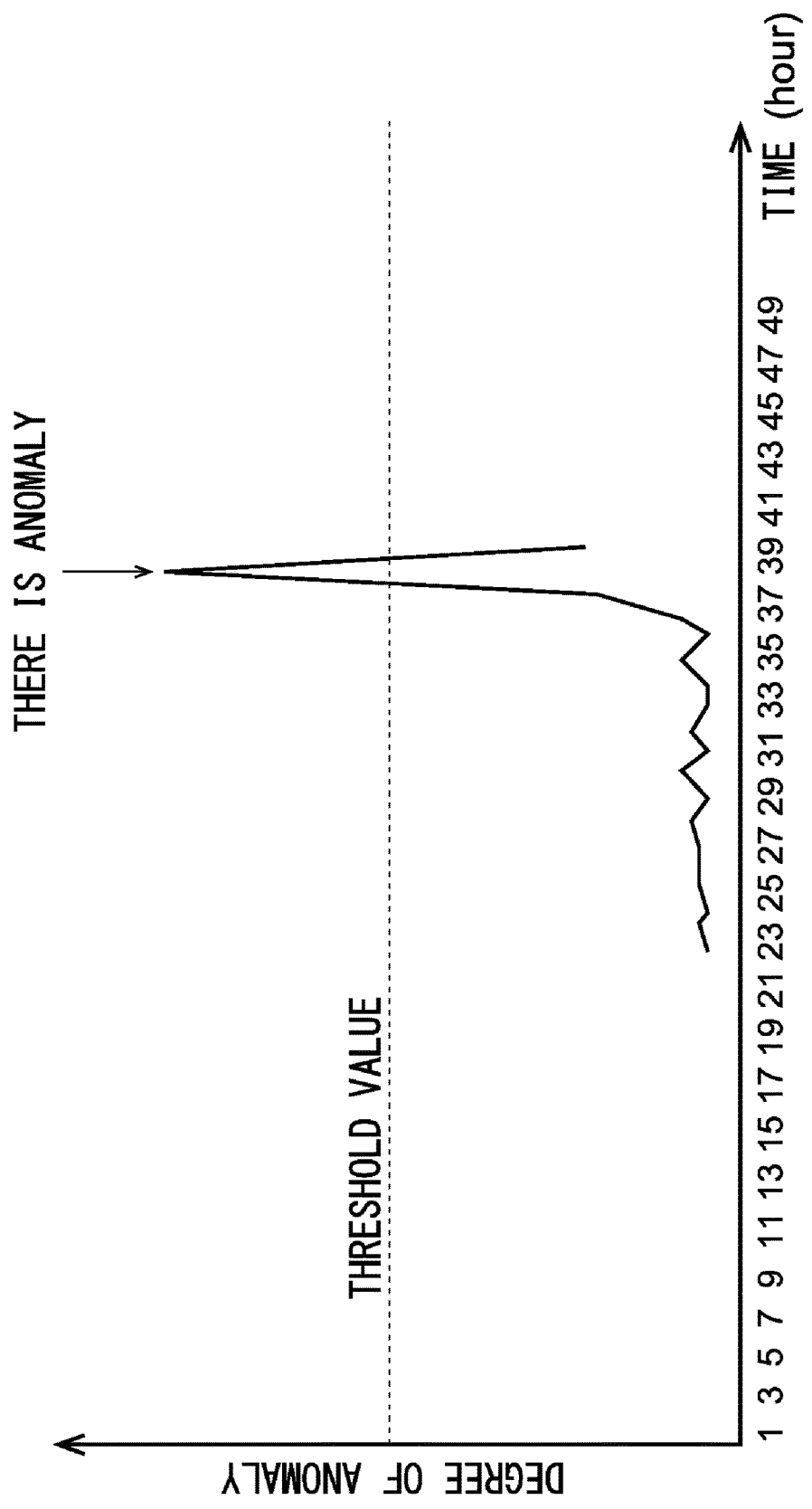
FIG. 2 is a diagram for describing an exemplary method of determining an anomaly.

FIG. 2 is a diagram for describing an exemplary method of determining an anomaly. In the example of FIG. 2, the square of the difference between the actual measurement value R1 and the forecast value R2 in the forecasting period T2 is defined as the degree of anomaly. When the degree of anomaly exceeds a threshold value, the computing machine determines that the network has an anomaly.

Figure 3:
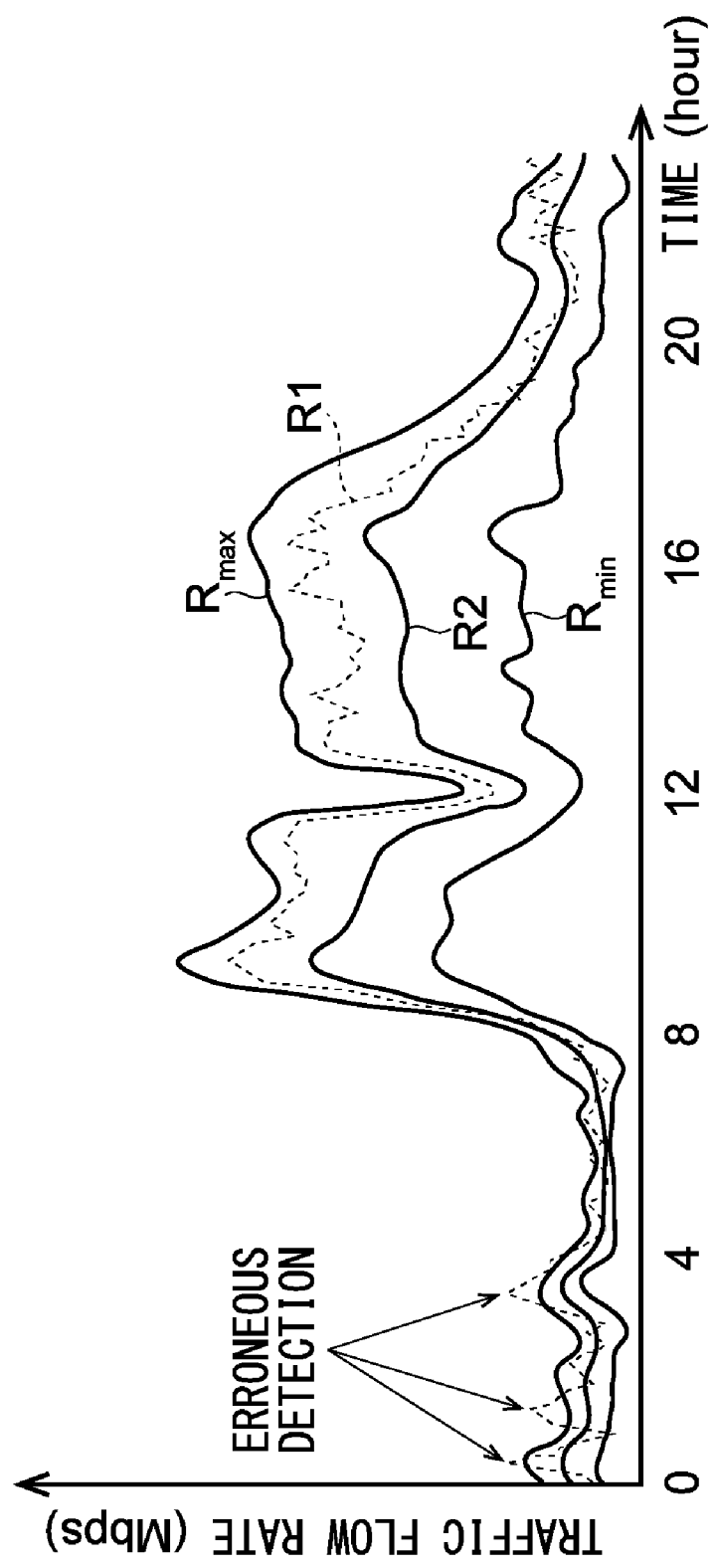
FIG. 3 is a diagram for describing another exemplary method of determining an anomaly.

FIG. 3 is a diagram for describing another exemplary method of determining an anomaly. In the example of FIG. 3, the upper limit Rmax and the lower limit Rmin are set above and below the forecast value R2 obtained using ARIMA. When the actual measurement value R1 is between the upper limit Rmax and the lower limit Rmin at a certain time, the computing machine determines that the network is normal at the certain time. By contrast, when the actual measurement value R1 is not between the upper limit Rmax and the lower limit Rmin at a certain time, the computing machine determines that an anomaly occurs in the network at the certain time.

In this example, the computing machine performs the learning in the learning period T1 during which the traffic flow rate varies periodically as in FIG. 1, and calculates the forecast value R2 using ARIMA based on the results of learning. The forecast value R2 becomes a forecast value based on the assumption that the traffic flow rate does not randomly vary and varies periodically. Therefore, the accuracy of the forecast value R2 is high in daytime hours during which random traffic is less likely to occur, which allows the computing machine to determine the anomaly of the network using the forecast value R2.

However, the accuracy of the forecast value R2 in the night-time and on a public holiday is low because the traffic rate in the night-time and on a public holiday is likely to vary randomly because of unexpected traffic. Therefore, in the night-time and on a public holiday, the actual measurement value R1 may be out of the range between the upper limit Rmax and the lower limit Rmin even when the network is normal, resulting in erroneous detection of the anomaly of the network.

Hereinafter, an embodiment that reduces such erroneous detections and determines whether the network has an anomaly with high accuracy will be described.

Embodiment

Figure 4:
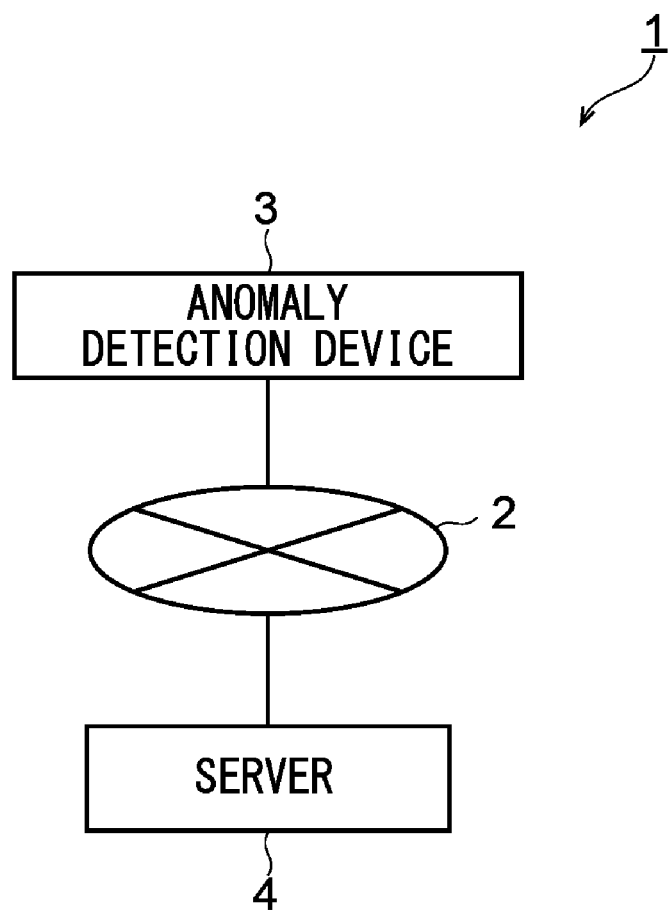
FIG. 4 is a configuration diagram of a system in accordance with an embodiment.

FIG. 4 is a configuration diagram of a system in accordance with an embodiment. A system 1 is a system that determines whether a network 2 such as, but not limited to, the Internet has an anomaly, and includes an anomaly detection device 3 and a server 4.

The server 4 is a physical server for establishing, for example, a customer system, and is connected to the network 2. The anomaly detection device 3 is a computing machine such as, but not limited to, a server or a personal computer (PC) for determining whether the network 2 has an anomaly.

Next, a description will be given of an anomaly detection method in accordance with the embodiment. FIG. 5A to FIG. 10 are schematic views for describing the anomaly detection method in accordance with the embodiment.

Figure 5A:
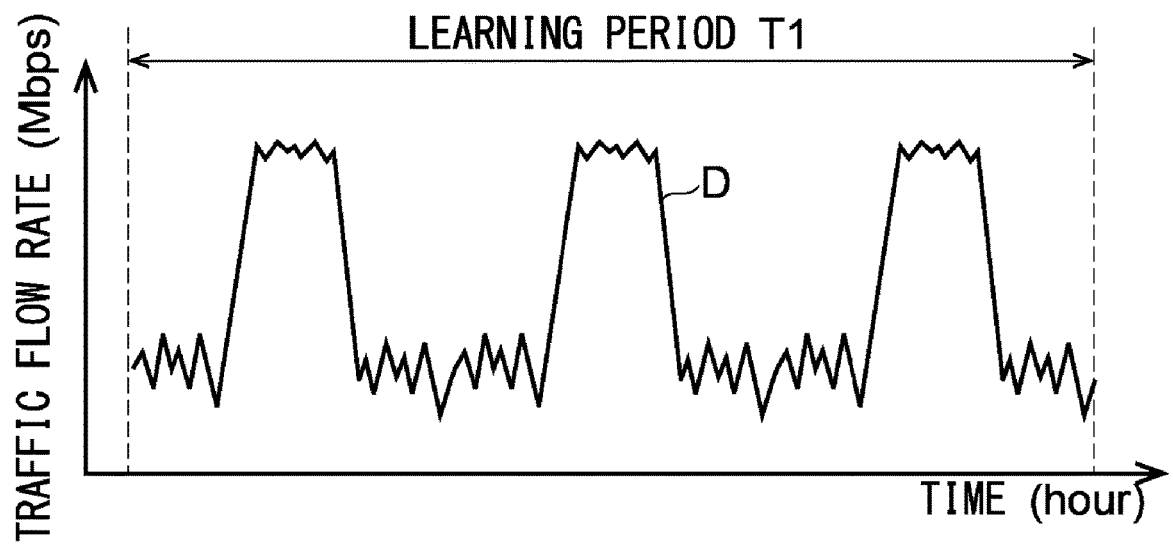
FIG. 5A and FIG. 5B are schematic views (No. 1) for describing an anomaly detection method in accordance with the embodiment.

First, as illustrated in FIG. 5A, the anomaly detection device 3 generates time-series data D of the traffic flow rate of the network 2 in the learning period T1 of approximately one week to four weeks. The time-series data D is data in which a traffic flow rate is associated with the time at which the traffic flow rate was obtained. The traffic flow rate is an example of a parameter relating to the network 2.

The traffic flow rate increases with the start of the business hour when the customer starts business operations, and decreases with the end of the business hour. Thus, the time-series data D varies periodically in cycles of approximately one day.

Figure 5B:
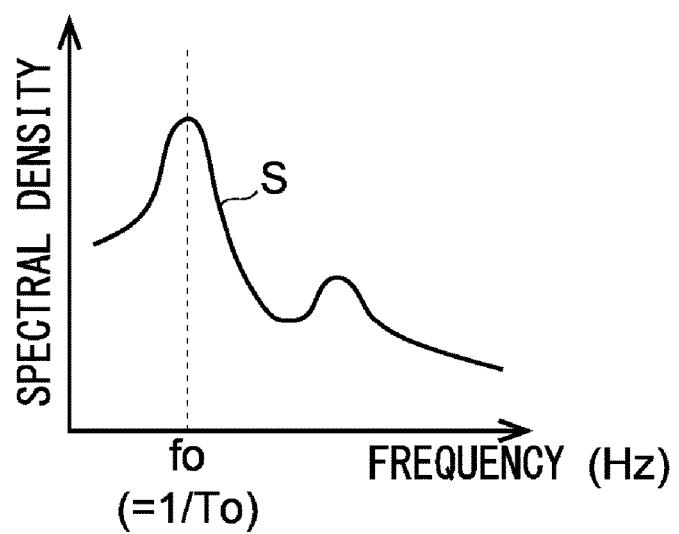

Next, as illustrated in FIG. 5B, the anomaly detection device 3 obtains the spectral density S of the time-series data D by performing the fast Fourier transformation on the time-series data D. Then, the anomaly detection device 3 calculates the main component fo of the frequency at which the spectral density S is largest.

Figure 6A:
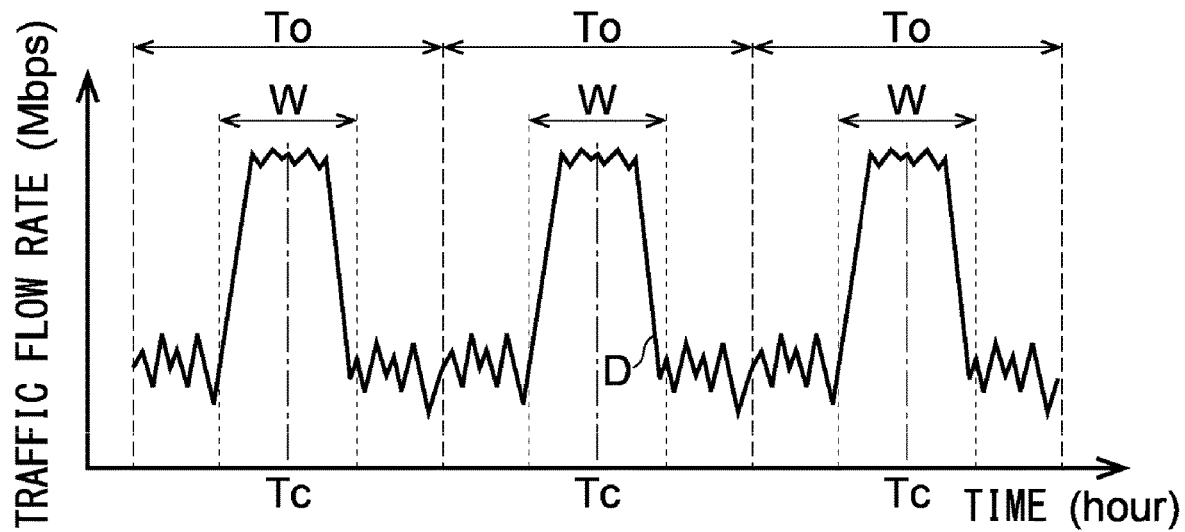
FIG. 6A and FIG. 6B are schematic views (No. 2) for describing the anomaly detection method in accordance with the embodiment.

Then, as illustrated in FIG. 6A, the anomaly detection device 3 calculates the period To that is the reciprocal of the main component fo. The period To is approximately a period in which the time-series data D periodically varies. For example, since the customer repeats business operations every day in the customer system, the period To is approximately one day.

Then, the anomaly detection device 3 identifies the reference time Tc at which the value of the time-series data D is largest within this period To. The reference time Tc is an example of a second time. Furthermore, the anomaly detection device 3 sets a window width W while maintaining the reference time Tc at the center of the window width W. The window width W is a time duration for which the time-series data D are sampled, and the time-series data D at certain times within the window width W are sampled. The window width W is less than the period To.

Figure 6B:
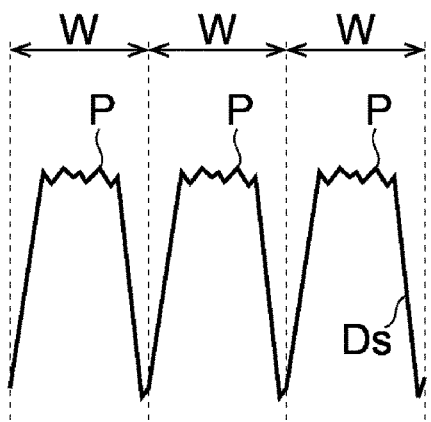

Then, as illustrated in FIG. 6B, the anomaly detection device 3 generates sample data Ds obtained by connecting the time-series data D within a plurality of the window widths W.

In the example of FIG. 6B, the height of the peak P of the sample data Ds within each window width W is substantially constant. However, in some cases, the peak P may vary with time.

Figure 7A:
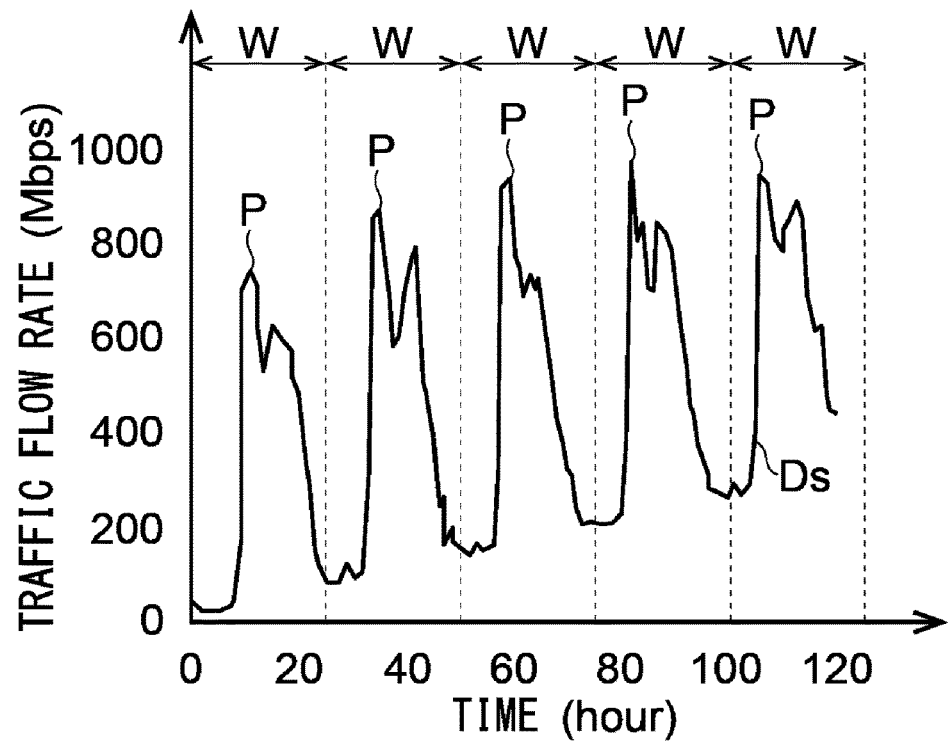
FIG. 7A and FIG. 7B are schematic views (No. 3) for describing the anomaly detection method in accordance with the embodiment.

FIG. 7A illustrates the sample data Ds when the peak P within each window width W varies with time. In this case, the sample data Ds tends to increase with time overall. In the present embodiment, it is determined whether the time-series data D have a periodicity on the basis of the sample data Ds. However, when the graph of the sample data Ds is inclined overall as in FIG. 7A, it is difficult to accurately determine whether the time-series data D have a periodicity.

Figure 7B:
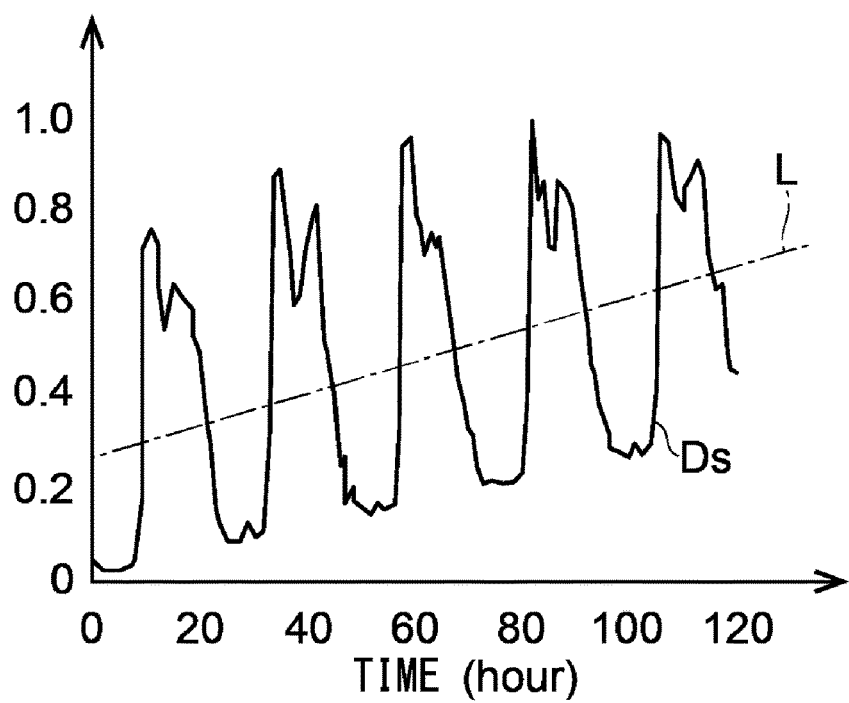

Therefore, as illustrated in FIG. 7B, the anomaly detection device 3 normalizes the sample data Ds by the largest value of the sample data Ds, and obtains the regression line L of the sample data Ds and the slope R of the regression line L.

Figure 8A:
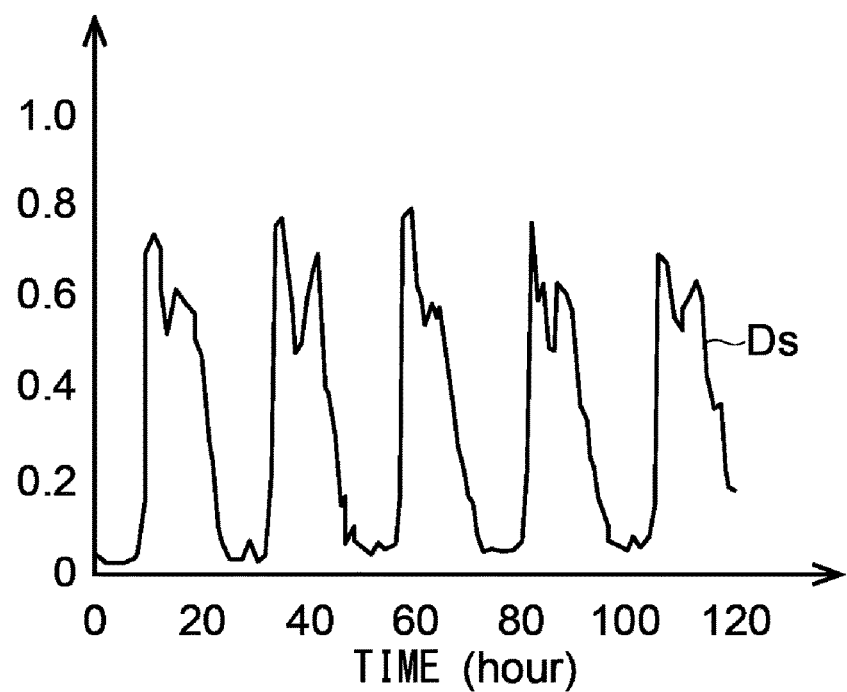
FIG. 8A and FIG. 8B are schematic views (No. 4) for describing the anomaly detection method in accordance with the embodiment.

Then, as illustrated in FIG. 8A, the anomaly detection device 3 subtracts the slope R from the sample data Ds.

Figure 8B:
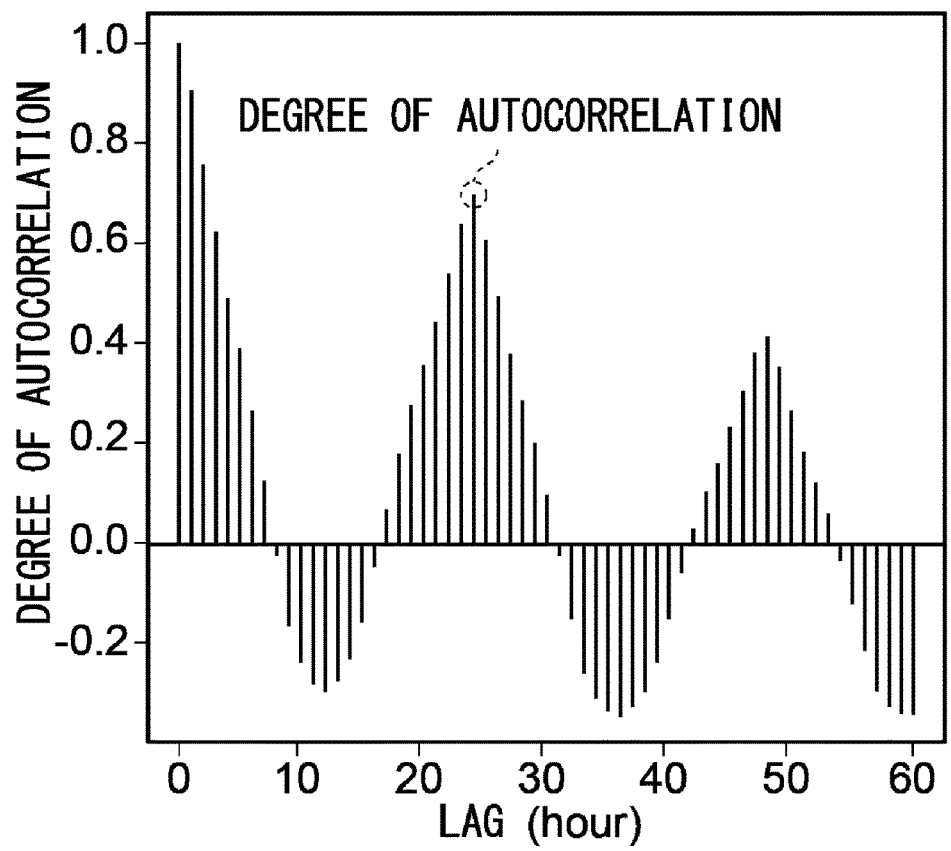

Then, as illustrated in FIG. 8B, the anomaly detection device 3 obtains the degree of autocorrelation of the time-series data D using the sample data Ds from which the slope R is subtracted.

In this example, the anomaly detection device 3 shifts the sample data Ds in the time axis direction, and determines the amount of the overlap between the pre-shifted sample data Ds and the post-shifted sample data Ds. The horizontal axis of FIG. 8B represents the shift amount by which the sample data Ds is shifted in the time axis direction, which is also called a lag.

Then, the anomaly detection device 3 obtains the peak value of the amount of the overlap at the lag other than "0" as the degree of autocorrelation. In this example, the value "0.7" at the lag "24" is the degree of autocorrelation.

When the time-series data D have no periodicity, the degree of autocorrelation is small. Therefore, the degree of autocorrelation can be used as a criterion to determine whether the time-series data D have a periodicity.

In addition, by subtracting the slope R from the sample data Ds as described above, the amount of the overlap between the sample data Ds before shifted in the time axis direction and the sample data Ds after shifted in the time axis direction can be evaluated properly, and the degree of autocorrelation can be calculated correctly.

Figure 9:
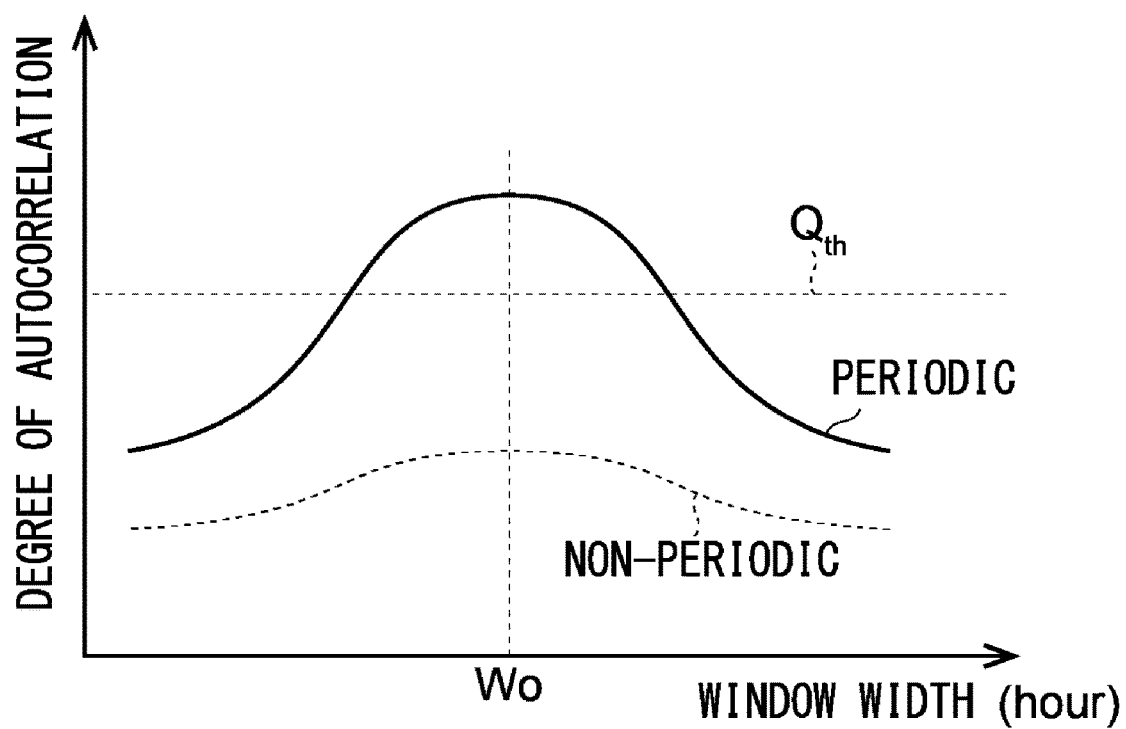
FIG. 9 is a schematic view (No. 5) for describing the anomaly detection method in accordance with the embodiment.

Then, as illustrated in FIG. 9, the anomaly detection device 3 varies the window width W, and obtains the degree of autocorrelation with respect to each window width W. Then, when there is the window width W of which the degree of autocorrelation is greater than a threshold value Qth, the anomaly detection device 3 determines that the time-series data D have a periodicity. The threshold value Qth is a threshold for determining whether the time-series data D have a periodicity, and the administrator of the network 2 determines the threshold value Qth at their own discretion. In addition, in this case, the anomaly detection device 3 identifies the window width Wo of which the degree of autocorrelation is largest. The window width Wo corresponds to the time period having the largest time duration among the time periods during which the time-series data D have a periodicity. The window width Wo is an example of a first window width.

By contrast, when there is no window width W of which the degree of autocorrelation is greater than the threshold value Qth as indicated by the dotted line in FIG. 9, the anomaly detection device 3 determines that the time-series data D have no periodicity.

Figure 10:
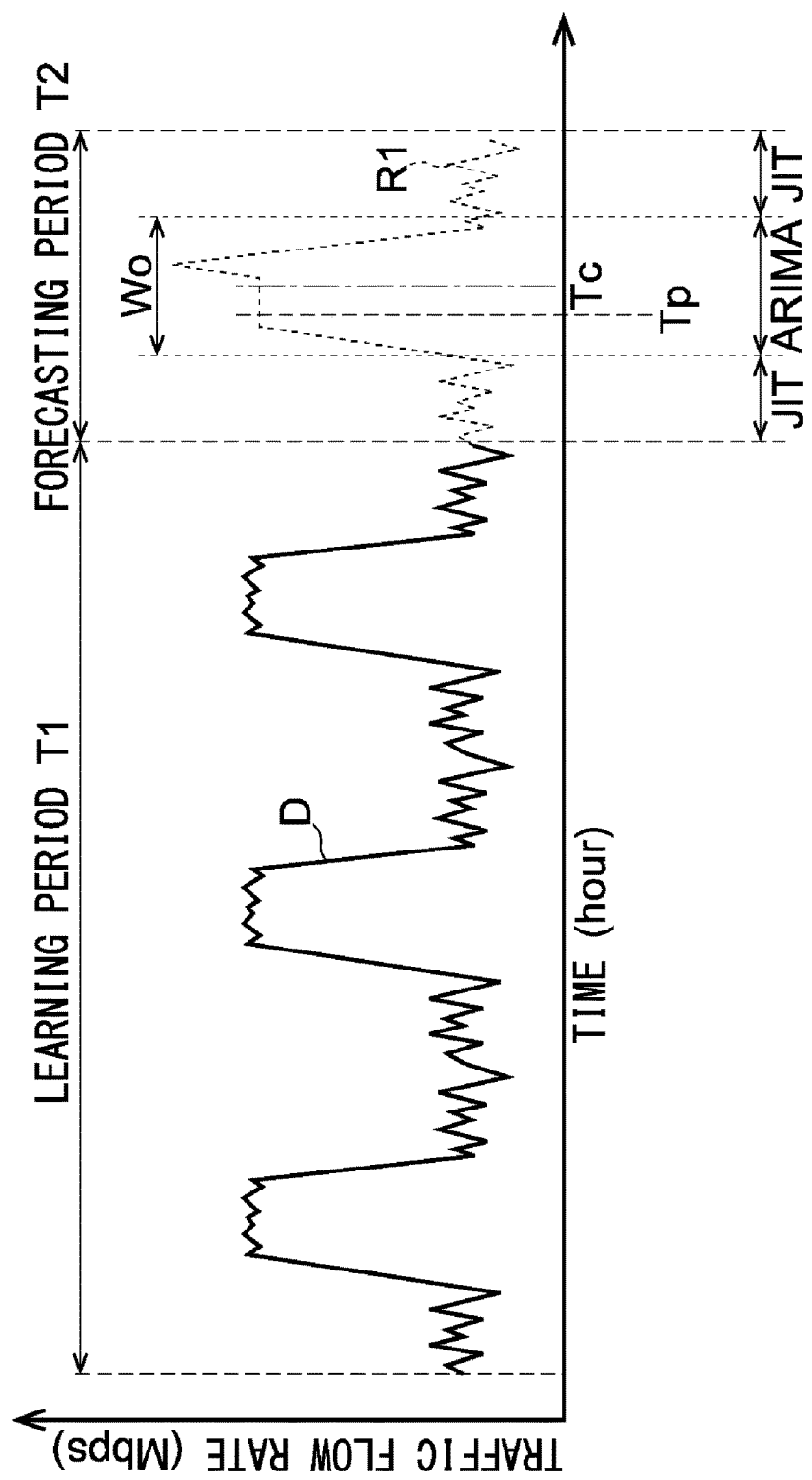
FIG. 10 is a schematic view (No. 6) for describing the anomaly detection method in accordance with the embodiment.

Then, as illustrated in FIG. 10, the anomaly detection device 3 determines whether a determination subject time (the current time) Tp is within the window width Wo in the forecasting period T2 after the learning period T1 of approximately one week to four weeks. The determination subject time Tp is an example of a first time.

Here, when the determination subject time Tp is within the window width Wo, the anomaly detection device 3 calculates the acceptable range of the traffic flow rate using ARIMA. For example, the anomaly detection device 3 calculates the forecast value of the traffic flow rate at the determination subject time Tp using ARIMA of which the learning data is the time-series data D of the learning period T1. ARIMA is an example of a first method.

When an anomaly is contained in the time-series data D in the learning period T1, the accuracy of the forecast value in the forecasting period T2 calculated using ARIMA decreases. Therefore, it is preferable for the anomaly detection device 3 to determine in advance whether the time-series data D contains no anomaly by machine learning, and calculate the forecast value with ARIMA using the time-series data D when determining that there is no anomaly. Instead, the administrator of the network 2 may check that the time-series data D in the learning period T1 contains no anomaly.

Then, the anomaly detection device 3 sets the value obtained by adding $3\sigma$ to the forecast value as the upper limit of the acceptable range, and sets the value obtained by subtracting $3\sigma$ from the forecast value as the lower limit of the acceptable range. Here, $\sigma$ is the standard deviation of the random variable defined by the difference between the actual measurement value of the traffic flow rate and the forecast value of the traffic flow rate. Then, the anomaly detection device 3 determines whether the network 2 has an anomaly according to whether the traffic flow rate at the determination subject time Tp is within the acceptable range.

By contrast, when the determination subject time Tp is outside the window width Wo, the anomaly detection device 3 calculates the acceptable range of the traffic flow rate using Just in Time (JIT) modeling. JIT modeling is an example of a second method.

Figure 11:
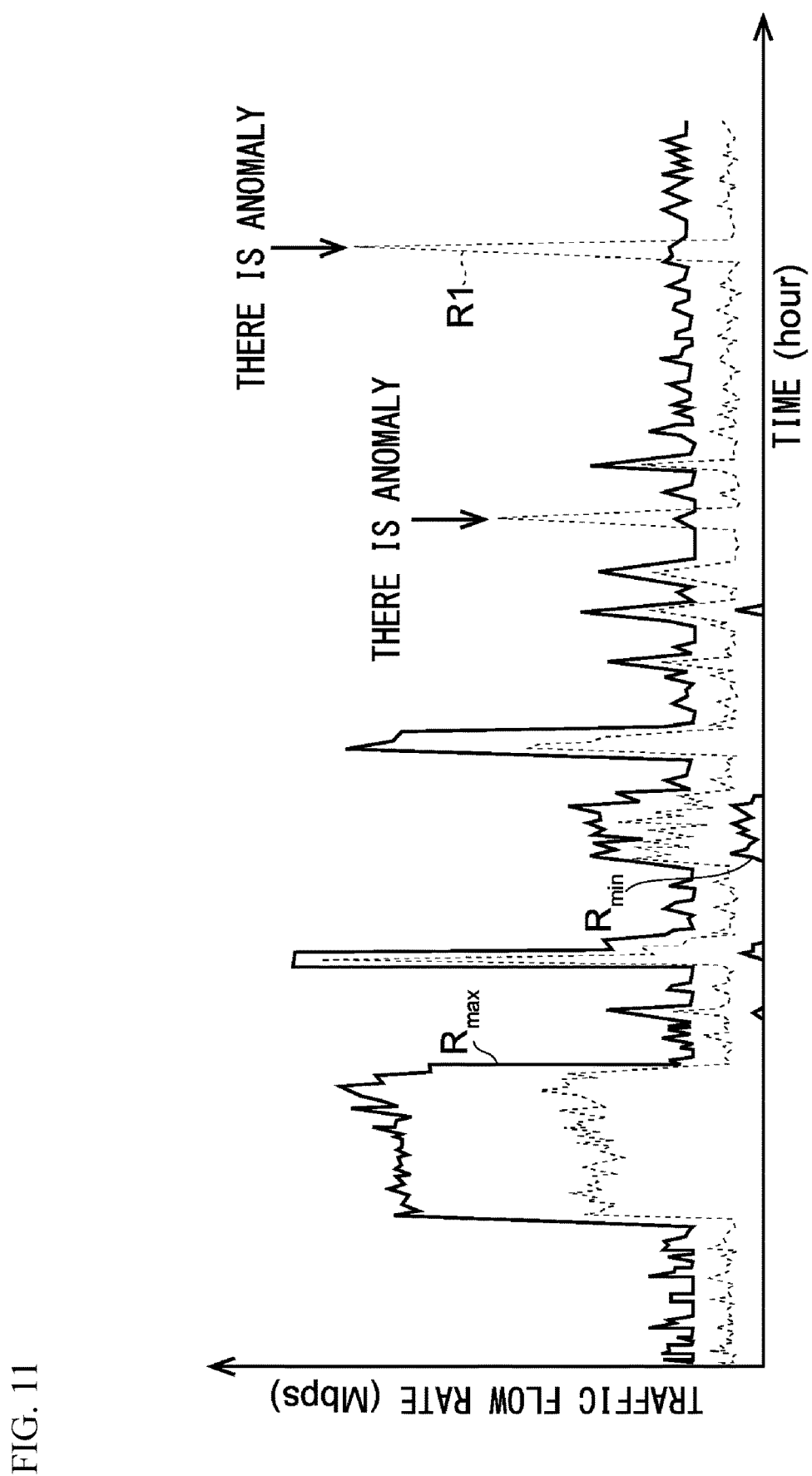
FIG. 11 illustrates an acceptable range of a traffic flow rate obtained using JIT modeling.

FIG. 11 illustrates the acceptable range of the traffic flow rate obtained using JIT modeling.

In JIT modeling, the upper limit Rmax and the lower limit Rmin of the forecast value of the traffic flow rate are calculated on the basis of past values of other parameters affecting the traffic flow rate. Examples of such parameters include, but are not limited to, a packet loss rate and Round Trip Time (RTT).

Then, the anomaly detection device 3 determines whether the network 2 has an anomaly according to whether the actual measurement value R1 of the traffic flow rate at the determination subject time Tp is within the acceptable range defined by the upper limit Rmax and the lower limit Rmin. In the example of FIG. 11, at the time when the actual measurement value R1 exceeds the upper limit Rmax, the anomaly detection device 3 determines that the network 2 has an anomaly.

The basic process of the anomaly detection method in accordance with the present embodiment is completed as described above.

In the present embodiment, as illustrated in FIG. 9, the anomaly detection device 3 identifies the window width Wo as the time period during which the time-series data D have a periodicity. Then, the anomaly detection device 3 determines whether there is an anomaly using ARIMA when the determination subject time Tp is within the window width Wo, and determines whether there is an anomaly using JIT modeling when the determination subject time Tp is outside the window width Wo.

As illustrated in FIG. 10, in this example, the time-series data D that periodically varies are used as the learning data for ARIMA. Thus, the higher accuracy of the forecast value by ARIMA in the window width Wo during which a periodicity is observed is achieved.

In addition, ARIMA is able to calculate the forecast value of the future traffic flow rate from only the past traffic flow rate. Therefore, even when it is impossible to obtain parameters other than the traffic flow rate, the anomaly detection device 3 can calculate the forecast value of the traffic flow rate within the window width Wo.

On the other hand, JIT modeling forecasts the traffic flow rate from the past values of the parameters different from the traffic flow rate. Therefore, even in the time period that is outside the window width Wo and during which the traffic flow rate itself has no periodicity, the forecast value of the traffic flow rate can be calculated with a certain degree of accuracy.

Thus, in the present embodiment, in both the time period during which the traffic flow rate has a periodicity and other time period, the anomaly detection device 3 can determine an anomaly of the network 2 with high accuracy, and is prevented from erroneously detecting an anomaly of the network 2.

Figure 12:
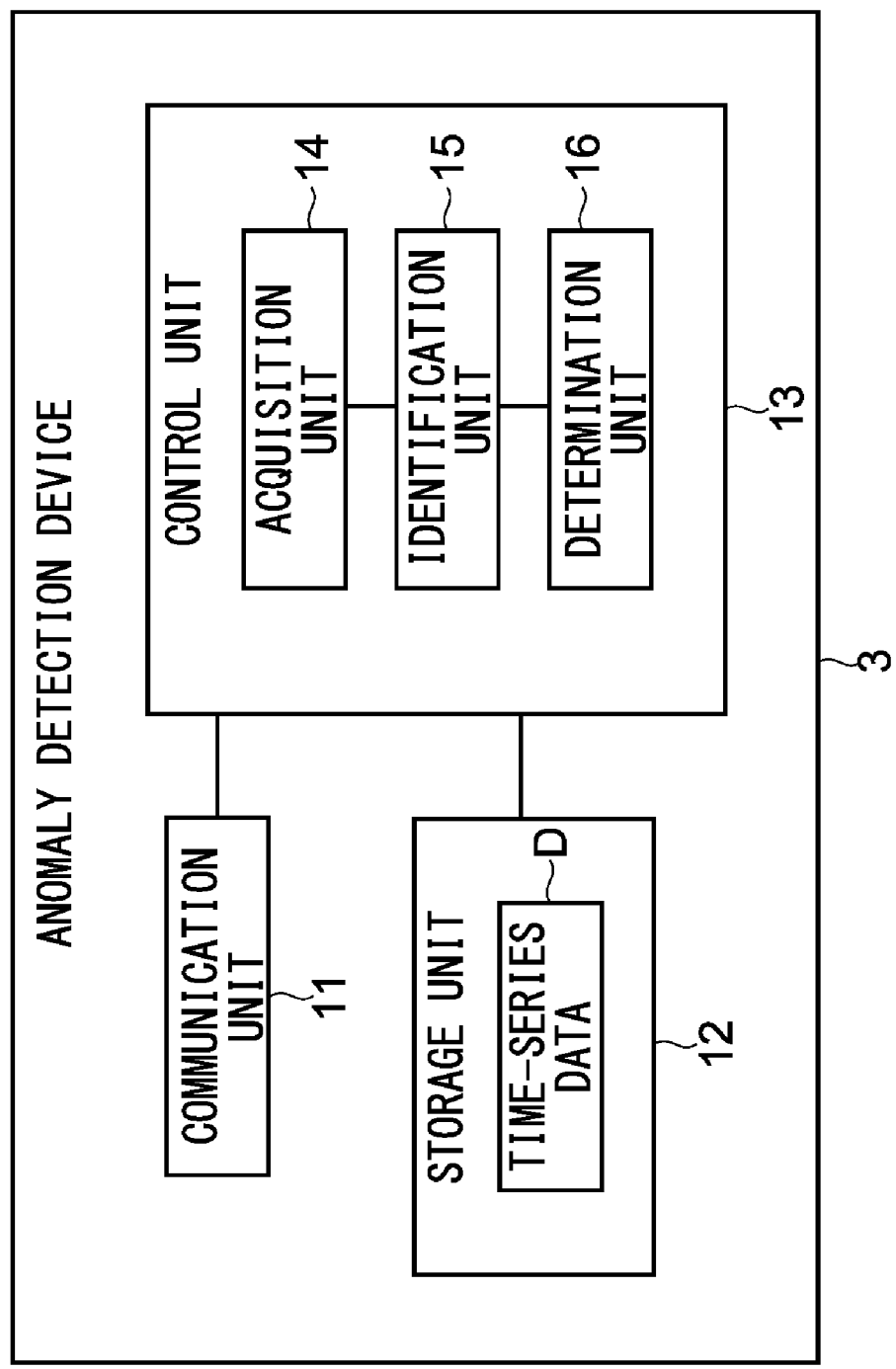
FIG. 12 is a functional block diagram of an anomaly detection device in accordance with the embodiment.

Next, the functional configuration of the anomaly detection device will be described. FIG. 12 is a functional block diagram of the anomaly detection device 3. As illustrated in FIG. 12, the anomaly detection device 3 includes a communication unit 11, a storage unit 12, and a control unit 13.

The communication unit 11 is an interface that connects the anomaly detection device 3 to the network 2. The storage unit 12 stores the time-series data D.

The control unit 13 is a processing unit that controls each unit of the anomaly detection device 3, and includes an acquisition unit 14, an identification unit 15, and a determination unit 16.

The acquisition unit 14 is a processing unit that acquires the actual measurement value of the traffic flow rate of the network 2 through the communication unit 11. The acquisition unit 14 generates the time-series data D in which the actual measurement value of the traffic flow rate is associated with the time at which the actual measurement value was acquired (see FIG. 5A) and stores them to the storage unit 12.

The identification unit 15 is a processing unit that identifies the time period during which the time-series data D have a periodicity. As an example, the identification unit 15 identifies the window width Wo by executing the process described in FIG. 5A to FIG. 9, and identifies the window width Wo as the time period during which the time-series data D have a periodicity.

The determination unit 16 is a processing unit that determines whether the network 2 has an anomaly. For example, the determination unit 16 determines whether there is an anomaly using ARIMA when the determination subject time Tp is within the window width Wo. In addition, the determination unit 16 determines whether there is an anomaly using JIT when the determination subject time Tp is outside the window width Wo.

Figure 13:
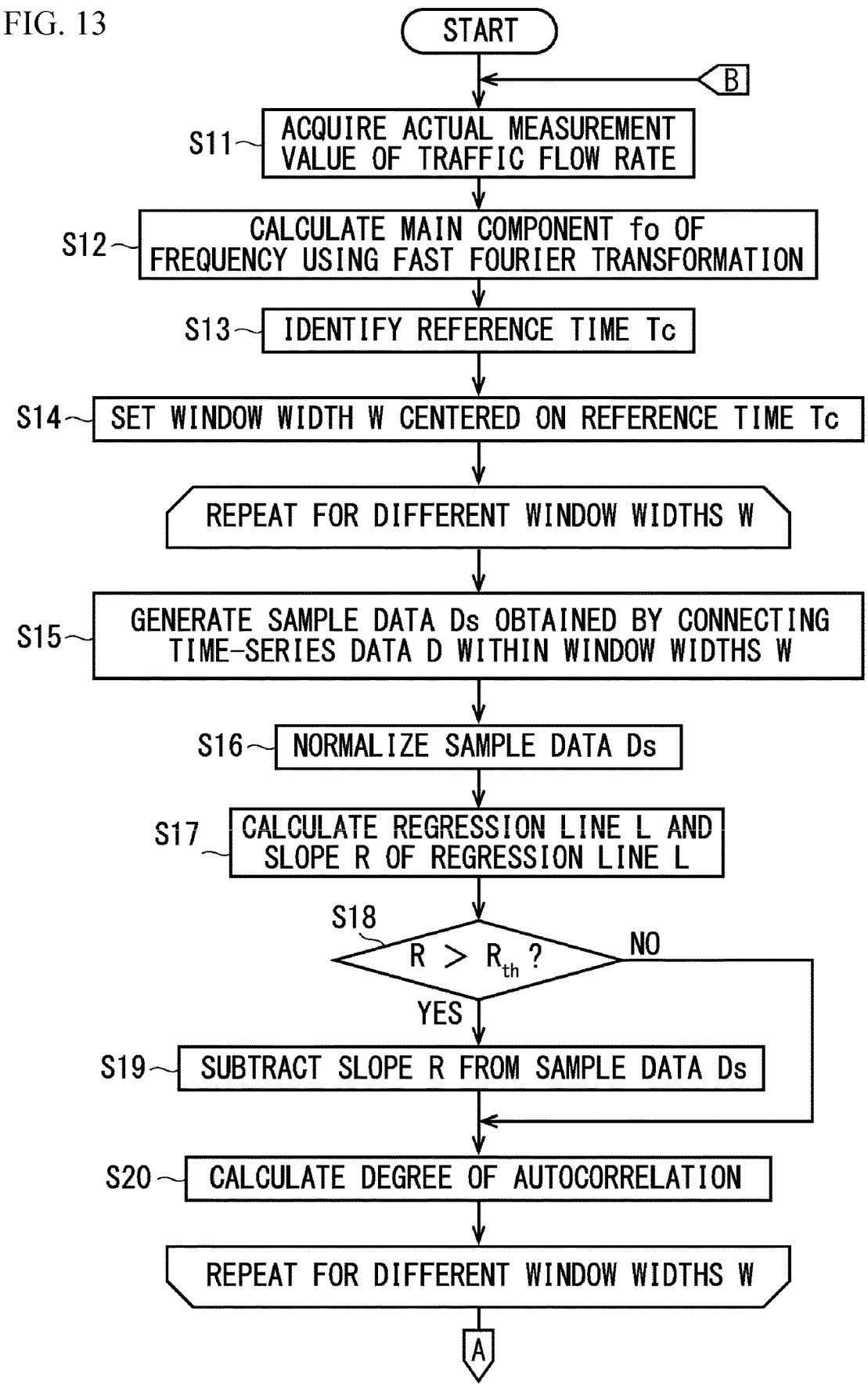
FIG. 13 is a flowchart (No. 1) of the anomaly detection method in accordance with the embodiment.
Figure 14:
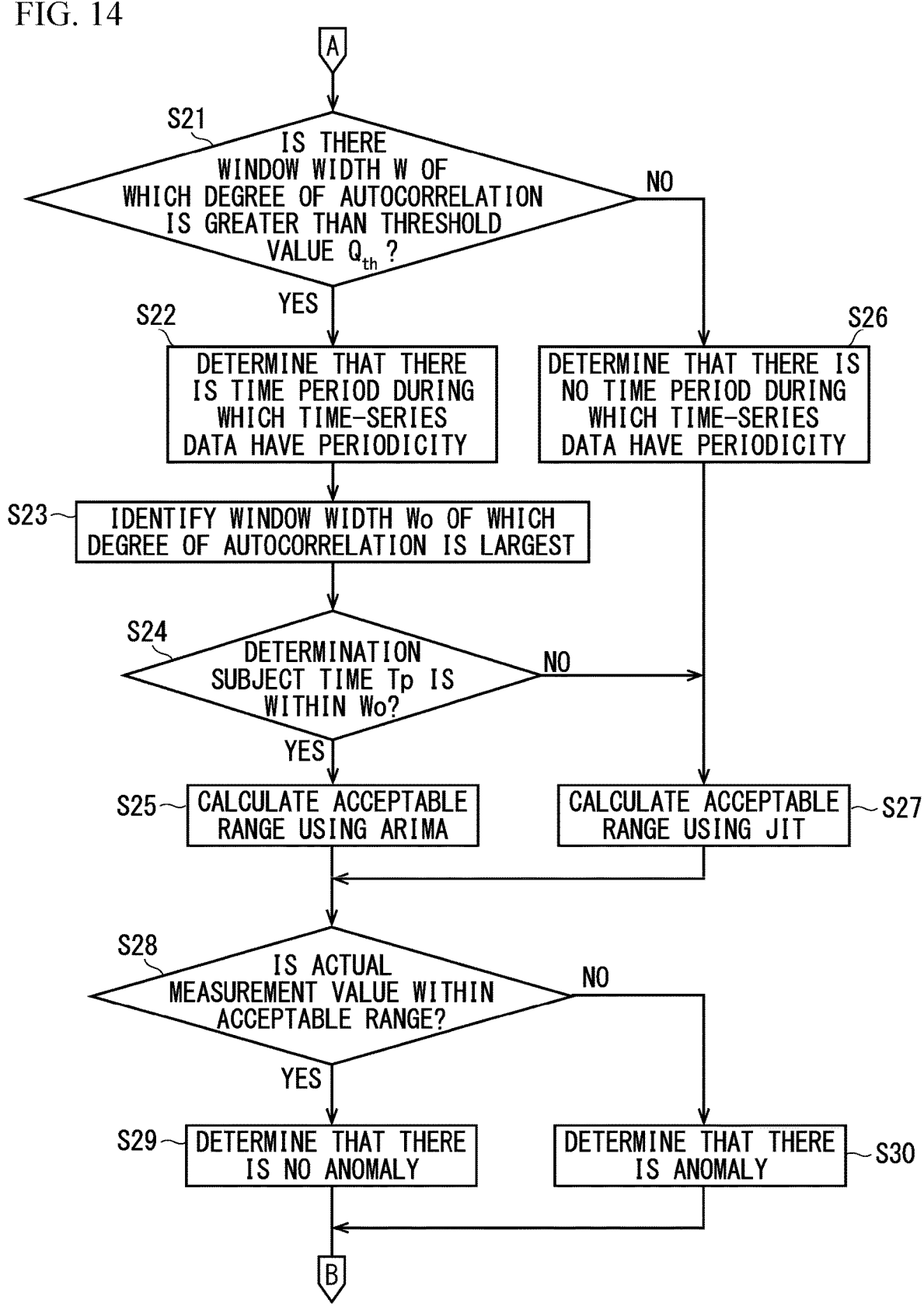
FIG. 14 is a flowchart (No. 2) of the anomaly detection method in accordance with the embodiment.

Next, a description will be given of the anomaly detection method in accordance with the present embodiment. FIG. 13 and FIG. 14 are flowcharts of the anomaly detection method in accordance with the embodiment.

First, in step S11, the acquisition unit 14 acquires the actual measurement value of the traffic flow rate. Furthermore, the acquisition unit 14 generates the time-series data D in which the actual measurement value is associated with the time at which the actual measurement value was acquired (see FIG. 5A), and stores the generated time-series data D in the storage unit 12.

Then, in step S12, the identification unit 15 performs the fast Fourier transformation on the time-series data D to calculate the main component fo of the frequency of the time-series data D.

Then, in step S13, the identification unit 15 obtains the period To that is the reciprocal of the main component fo. Then, the reference time Tc (see FIG. 6A) at which the time-series data D is largest within the period To is identified.

Then, in step S14, the identification unit 15 sets the window width W (see FIG. 6A) while maintaining the reference time To at the center of the window width W.

Then, in step S15, the identification unit 15 generates the sample data Ds (see FIG. 6B) obtained by connecting the time-series data D within a plurality of the window widths W.

Then, in step S16, the identification unit IS normalizes the sample data Ds by the largest value of the sample data Ds.

Then, in step S17, the identification unit 15 obtains the regression line L (see FIG. 7B) of the sample data Ds and the slope R of the regression line L.

Then, in step S18, the identification unit 15 determines whether the slope R is greater than the threshold value Rth. The threshold value Rth is a threshold for determining whether the sample data Ds is inclined to the extent that the correction, which subtracts the slope R from the sample data Ds, needs to be made, and is set in advance by, for example, the administrator of the network 2.

When it is determined that the slope R is greater than the threshold value Rth, the process proceeds to step S19.

In step S19, the identification unit 15 performs the correction that subtracts the slope R from the sample data Ds.

Then, in step S20, the identification unit 15 obtains the degree of autocorrelation of the time-series data D (see FIG. 8B) using the sample data Ds.

When it is determined that the slope R is not greater than the threshold value Rth in step S18, the identification unit 15 skips step S19, and executes step S20.

Thereafter, the identification unit 15 executes above steps S15 to S20 with respect to each of the different window widths W to calculate the degree of autocorrelation with respect to each window width W.

Then, in step S21, the identification unit 15 determines whether there is the window width W of which the degree of autocorrelation is greater than the threshold value Qth (see FIG. 9).

When it is determined that there is the window width W of which the degree of autocorrelation is greater than the threshold value Qth (step S21: YES), the process proceeds to step S22.

In step S22, the identification unit 15 determines that there is a time period during which the time-series data D have a periodicity.

Then, in step S23, the identification unit 15 identifies the window width Wo of which the degree of autocorrelation is largest among the window widths W as the time period during which the time-series data D have a periodicity.

Then, in step S24, the determination unit 16 determines whether the determination subject time Tp is within the window width Wo.

Here, when it is determined that the determination subject time Tp is within the window width Wo, the process proceeds to step S25.

In step S25, the determination unit 16 calculates the acceptable range of the traffic flow rate using ARIMA. As an example, the determination unit 16 calculates the forecast value of the traffic flow rate at the determination subject time Tp using ARIMA of which the learning data is the past time-series data D. and sets (the forecast value+3σ) as the upper limit of the acceptable range and (the forecast value −3σ) as the lower limit of the acceptable range.

Instead of ARIMA, Autoregressive (AR), Moving Average (MA), or Autoregressive Moving Average (ARMA) may be used to calculate the acceptable range. Which of AR, MA, ARMA, and ARIMA is to be used can be determined by the administrator of the network 2 on the basis of the characteristics of the time-series data D.

By contrast, when the identification unit 15 determines that there is no window width W of which the degree of autocorrelation is greater than the threshold value Qth in step S21, the process proceeds to step S26.

In step S26, the determination unit 16 determines that there is no time period during which the time-series data D have a periodicity.

Then, in step S27, the determination unit 16 calculates the acceptable range of the traffic flow rate using JIT. For example, the determination unit 16 calculates the acceptable range of the present traffic flow rate using JIT on the basis of the past packet loss rate and the past RTT affecting the present traffic flow rate.

Note that when it is determined that the determination subject time Tp is not within the window width Wo in step S24, step S27 is also executed.

After step S25 and step S27 are completed, the process proceeds to step S28, and the determination unit 16 determines whether the actual measurement value of the present traffic flow rate is within the acceptable range calculated in step S25 or step S27.

Here, when the determination unit 16 determines that the actual measurement value is within the acceptable range, the process proceeds to step S29, and the determination unit 16 determines that the network 2 has no anomaly. By contrast, when the determination unit 16 determines that the actual measurement value is not within the acceptable range in step S28, the process proceeds to step S30, and the determination unit 16 determines that the network 2 has an anomaly. Thereafter, the process returns to step S11.

The basic process of the anomaly detection method in accordance with the present embodiment is completed as described above.

In the above embodiment, the acceptable range is calculated using ARIMA (S25) when the determination subject time Tp is within the window width Wo, while the acceptable range is calculated using MT modeling (S27) when the determination subject time Tp is not within the window width Wo.

Since ARIMA uses the time-series data D having a periodicity as the learning data, the determination unit 16 can precisely calculate the acceptable range within the window width Wo within which the time-series data D have a periodicity. In addition, a good acceptable range for the time-series data D having randomness can be calculated using JIT modeling. Therefore, in both the case where the determination subject time Tp is inside the window width Wo and the case where the determination subject time Tp is outside the window width Wo, the determination unit 16 can precisely calculate the acceptable range, and the determination accuracy of whether the network 2 has an anomaly can be increased.

In addition, when the identification unit 15 determines that there is no window width W of which the degree of autocorrelation is greater than the threshold value Qth in step S21, this means that the time-series data D have no periodicity. In this case, the anomaly of the network 2 can be determined accurately by calculating the acceptable range using JIT modeling that does not depend on the periodicity of the traffic flow rate in step S27 even when the time-series data D have no periodicity. Hardware configuration.

Figure 15:
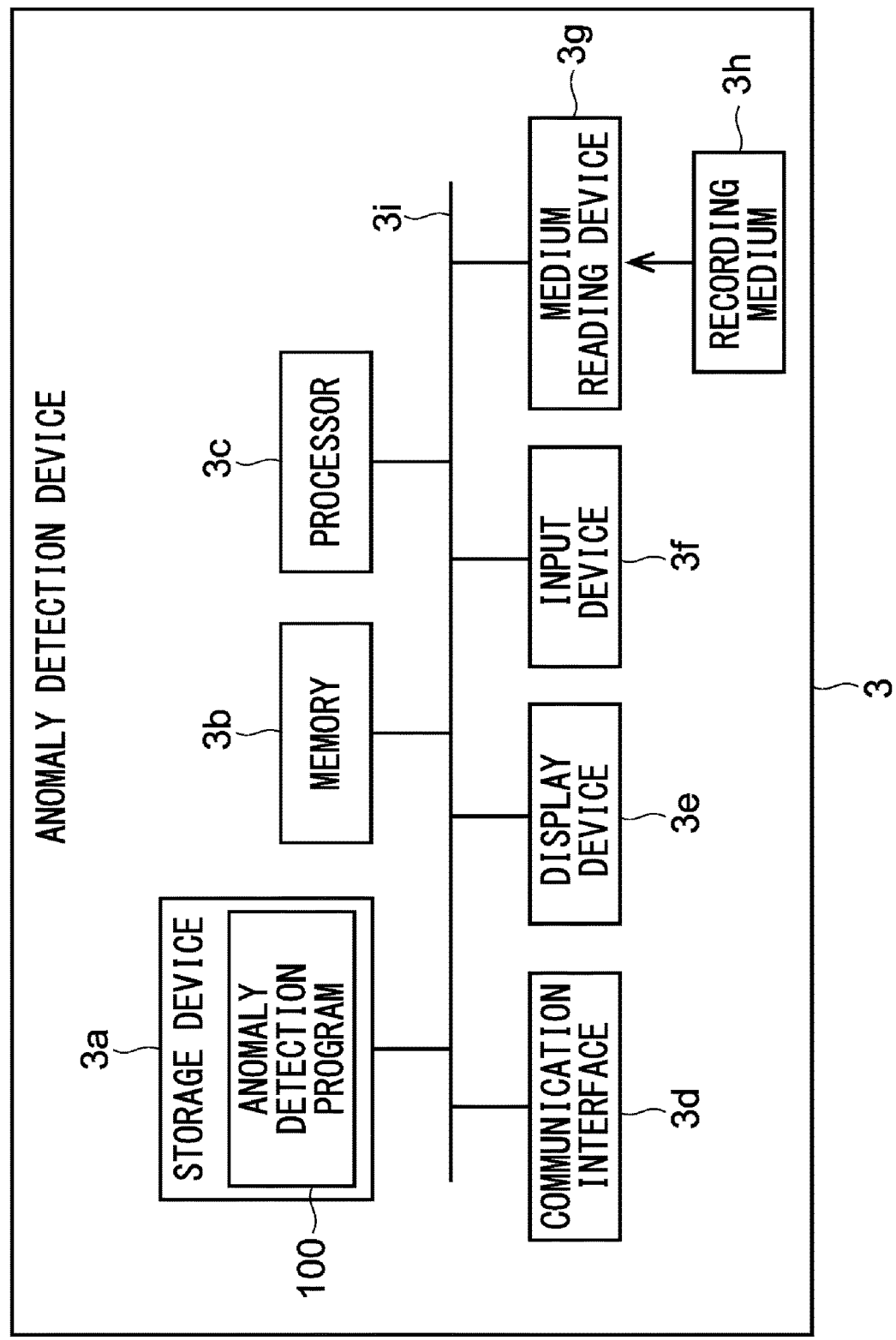
FIG. 15 is a hardware configuration diagram of the anomaly detection device in accordance with the embodiment.

FIG. 15 is a hardware configuration diagram of the anomaly detection device 3.

As illustrated in FIG. 15, the anomaly detection device 3 includes a storage device 3a, a memory 3b, a processor 3c, a communication interface 3d, a display device 3e, an input device 3f, and a medium reading device 3g. These components are interconnected through a bus 3i.

The storage device 3a is a non-volatile storage such as, but not limited to, a hard disk drive (HDD) or a solid state drive (SSD), and stores an anomaly detection program 100 in accordance with the present embodiment.

Note that the anomaly detection program 100 may be stored in a computer-readable recording medium 3h, and the processor 3c may be caused to read the anomaly detection program 100 through the medium reading device 3g.

Examples of such a recording medium 3h include, but are not limited to, a physical portable storage medium such as a compact disc-read only memory (CD-ROM), a digital versatile disc (DVD), and a universal serial bus (USB) memory. Alternatively, a semiconductor memory such as a flash memory or a hard disk drive may be used as the recording medium 3h. These storage media 3h are not temporal storage media such as carrier waves that have no physical form.

Yet alternatively, the anomaly detection program 100 may be stored in a device connected to a public network, the Internet, or a local area network (LAN). In this case, the processor 14c reads the anomaly detection program 100 and executes it.

The memory 3b is a hardware device, such as a dynamic random-access memory (DRAM), that temporarily stores data, and the anomaly detection program 100 is expanded on the memory 3b.

The processor 3c is a hardware device such as a central processing unit (CPU) or a graphical processing unit (GPU) that controls each component of the anomaly detection device 3. The processor 3c executes the anomaly detection program 100 in cooperation with the memory 3b.

The control unit 13 (see FIG. 12) of the anomaly detection device 3 is implemented by the memory 3b and the processor 3c cooperatively executing the anomaly detection program 100. The control unit 13 includes the acquisition unit 14, the identification unit 15, and the determination unit 16.

The storage unit 12 (see FIG. 12) is implemented by the storage device 3a and the memory 3b.

The communication interface 3d is a communication interface such as a network interface card (NIC) for connecting the anomaly detection device 3 to the network 2 (see FIG. 4). The communication unit 11 (see FIG. 12) is implemented by the communication interface 3d.

The display device 3e is a hardware device such as a liquid crystal display device or a touch panel for displaying various information.

The input device 3f is a hardware device such as a keyboard and a mouse for allowing the administrator of the network 2 to input various data to the anomaly detection device 3.

The medium reading device 3g is a hardware device such as a CD drive, a DVD drive, and a USB interface for reading the recording medium 3h.

The anomaly detection device 3 can determine whether the network 2 has an anomaly with high accuracy as described above. This inhibits the anomaly detection device 3 from using the hardware device such as the memory 3b and the processor 3c unnecessarily and making erroneous determination, and achieves the technical improvement of using the hardware resources efficiently when determining an anomaly.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. An anomaly detection method implemented by a computer, the anomaly detection method comprising:
    calculating a frequency at which a spectral density of time-series data of a first parameter relating to a network is largest;
    identifying a first time at which a value of the time-series data is largest within a period corresponding to the frequency; and
    when there is a first window width of which a degree of autocorrelation is greater than a threshold value exists in the time-series data, determining that the time-series data have a periodicity;
    identifying, as a time period during which the time-series data have the periodicity, a second window width of which the degree of autocorrelation is largest when varying the first window width while maintaining the first time at a center of the first window width;
    when a second time is within the time period, determining whether the network has an anomaly using a first method based on the time-series data; and when the second time is not within the time period, determining whether the network has an anomaly using a second method different from the first method.

2. The anomaly detection method according to claim 1, further comprising:
when the time period during which the time-series data have a periodicity does not exist, determining whether the network has an anomaly using the second method.

3. The anomaly detection method according to claim 1, wherein the first method is one selected from a group consisting of Autoregressive Integrated Moving Average (ARIMA), Autoregressive (AR), Moving Average (MA), and Autoregressive Moving Average (ARMA) that use the time-series data as learning data.

4. The anomaly detection method according to claim 1, wherein the second method is a method using a second parameter affecting to the first parameter.

5. The anomaly detection method according to claim 4, wherein the second method is Just in Time (JIT) modeling.

6. A non-transitory computer-readable recording medium storing an anomaly detection program that causes a computer to execute a process, the process comprising:
calculating a frequency at which a spectral density of time-series data of a first parameter relating to a network is largest;
identifying a first time at which a value of the time-series data is largest within a period corresponding to the frequency; and
when there is a first window width of which a degree of autocorrelation is greater than a threshold value exists in the time-series data, determining that the time-series data have a periodicity;
identifying, as a time period during which the time-series data have the periodicity, a second window width of which the degree of autocorrelation is largest when varying the first window width while maintaining the first time at a center of the first window width;
when a second time is within the time period, determining whether the network has an anomaly using a first method based on the time-series data; and
when the second time is not within the time period, determining whether the network has an anomaly using a second method different from the first method.

7. An anomaly detection method implemented by a computer, the anomaly detection method comprising:
identifying a time period during which time-series data of a traffic flow rate relating to a network have a periodicity;
when a first time is within the time period, determining whether the network has an anomaly using a first method based on the time-series data; and
when the first time is not within the time period, determining whether the network has an anomaly using a second method different from the first method;
wherein the first method is Autoregressive Integrated Moving Average (ARIMA) that uses the time-series data as learning data,
in the first method, a forecast value of the traffic flow rate is calculated by the ARIMA, and
the determining whether the network has the anomaly using the first method is performed depending on whether the traffic flow rate at the first time is within a first acceptable range defined by a first upper limit obtained by adding $3\sigma$ to the forecast value and a first lower limit obtained by subtracting $3\sigma$ from the forecast value, the $\sigma$ being a standard deviation of a random variable defined by a difference between an actual measurement value of the traffic flow rate and the forecast value of the traffic flow rate.

8. The anomaly detection method according to claim 7, wherein
the second method is Just in Time (JIT) modeling,
in the JIT modeling, a second upper limit and a second lower limit of a forecast value of the traffic flow rate are calculated based on past values of other parameters affecting the traffic flow rate, and
the determining whether the network has the anomaly using the second method is performed depending on whether the traffic flow rate at the first time is within a second acceptable range defined by the second upper limit and the second lower limit.

* * * * *